United States Patent [19]
Menzies

[11] 3,761,715
[45] Sept. 25, 1973

[54] ATMOSPHERIC POLLUTANT SENSING DEVICE

[75] Inventor: Robert T. Menzies, Pasadena, Calif.

[73] Assignee: California Institute of Technology, Pasadena, Calif.

[22] Filed: Apr. 21, 1971

[21] Appl. No.: 135,929

Related U.S. Application Data

[63] Continuation-in-part of Ser. No. 80,583, Oct. 14, 1970, abandoned.

[52] U.S. Cl. .......... 250/338, 250/363, 250/393
[51] Int. Cl. .............................. G01j 3/00
[58] Field of Search ............... 250/83.3 H, 43.5 R, 250/43.5 D, 218, 219, 71 R, 71.5 R; 356/104, 103, 28, 96, 97

[56] References Cited
UNITED STATES PATENTS 3,446,558  5/1969  Seaton ..................... 250/43.5 R
3,566,114  4/1968  Brewer ..................... 250/71 R

OTHER PUBLICATIONS

Mandel; "Heterodyne Detection of a Weak Light Beam;" J. Opt. Soc.; Vol. 56, No. 9; Sept. 66; pp. 1200–1206; Sci. Lib.

*Primary Examiner*—Archie R. Borchelt
*Attorney*—Lindenberg, Freilich & Wasserman

[57] ABSTRACT

It has been found that a laser can provide emissions which are absorbed by pollutants, such as NO, $NO_2$, $N_2O_4$, $SO_2$ and CO. The laser emission is used to resonantly excite the pollutant molecules and then to act as a local oscillator for a superheterodyne radiometer to detect the fluorescence occurring in response to the stimulation.

13 Claims, 4 Drawing Figures

INVENTOR
ROBERT T. MENZIES
BY Lindenberg, Freilich & Wasserman
ATTORNEYS

ATMOSPHERIC POLLUTANT SENSING DEVICE

CROSS-REFERENCE TO RELATED APPLICATIONS

This application is a continuation-in-part of application Ser. No. 80,583 filed Oct. 14, 1970, for ATMOSPHERIC POLLUTANT SENSING DEVICE, and now abandoned.

The invention herein described was made in the course of or under a grant with the United States Air Force Office of Scientific Research, Office of Aerospace Research, U.S. Air Force.

BACKGROUND OF THE INVENTION

This invention relates to radiometer detectors and more particularly to improvements therein.

There is presently a great deal of concern over the pollutants which are filling the earth's atmosphere. One of the pollutants which occurs when fossile fuels are burned is nitric oxide. This is found in the emissions from smoke stacks as well as automobile exhausts and is involved in the chemical process forming smog. A great deal of effort has gone into developing instruments which can observe the thermal emissions, chimneys or exhausts, etc. and can indicate whether or not they contain these smog producing molecules.

OBJECTS AND SUMMARY OF THE INVENTION

An object of this invention is to produce a radiometer detector which is operative in response to fluorescence of an impurity as nitric oxide, when stimulated by laser radiation.

Another object of this invention is the provision of a novel laser radiometer detector. Yet, another object of the present invention is the provision of a nitric oxide radiometer detector.

These and other objects of this invention are achieved, in one embodiment of this invention, by directing laser radiations, having wavelengths which are absorbed by the pollutants, at the source of pollutants. The light stimulated pollutants emit characteristic radiations which may be a heterodyned with other laser radiations to produce signals indicative of the presence and quantity of pollutants. In a second embodiment of the invention a second laser may be used to provide signals of the desired heterodyning frequency. The laser may be a CO laser or a $CO_2$ laser, the frequency of whose output may be doubled. Pollutants such as $SO_2$, NO, $NO_2$, $N_2O_4$ and CO are thus detectable.

The novel features of the invention are set forth with particularity in the appended claims. The invention will best be understood from the following description when read in conjunction with the accompanying drawings.

DESCRIPTION OF THE PREFERRED EMBODIMENT

Several spectral coincidences in the 5 to 6 micron wavelength region between emission lines of the carbon monoxide laser and absorption lines of NO and $N_2O_4$ have been observed. Also, it has been observed that $SO_2$ absorbs wavelengths in the region of 7 to 8 microns, which are emitted by the CO laser. In addition, coincidences with absorption lines of $NO_2$ and CO can be predicted on the basis of laboratory measurements. Advantage of this is taken in the embodiments of the invention to be described.

Figure 1:
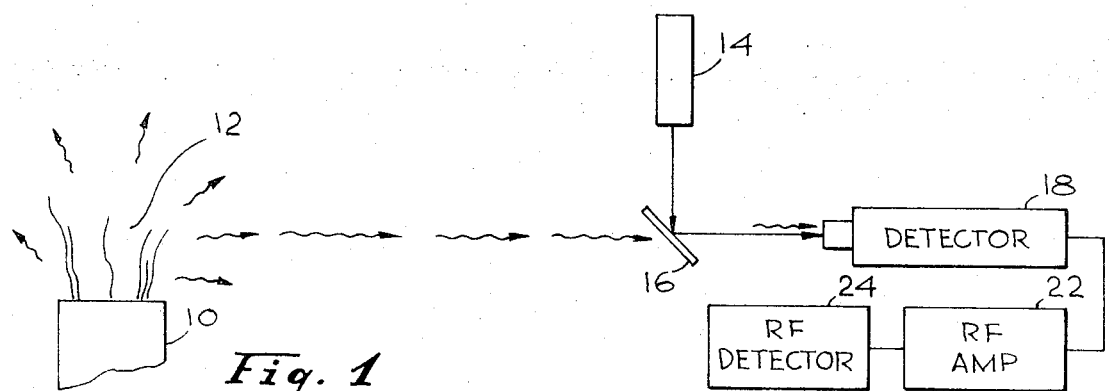
FIG. 1 is a schematic diagram of an embodiment of the invention.

FIG. 1 is a block schematic diagram of a radiometer for detecting the presence of pollutants, such as those mentioned, wherein the pollutants are emitted from a source, such as a smoke stack 10. The smoke stack emission 12 contains thermal radiation from the emitted particles and molecules such as thermal radiation from NO. The radiometer includes a CO laser, 14, which acts as a local oscillator. It emits several different lines, some of which coincide with the NO or other mentioned pollutant thermal emission lines in their wavelengths. The light emitted by the CO laser is directed, by a beam splitter 16, at a detector 18.

Some of the thermal radiation emitted by NO will also pass through the beam splitter 16 (signified by wavy arrow) and fall on detector 18. The CO laser line which closely coincides with an NO thermal emission line in wavelength will produce a strong heterodyne signal from the detector 18. The detector may be a photoconductor or photodiode made of lead selenide or indium antimonide. These photoconductors are sensitive to a 5 micron wavelength which is in the infrared region. The detection system is responsive only to a signal produced as a result of heterodyning the CO laser emission and that part of the NO emission which is of very nearly the same wavelength. The output of the detector element, consisting of the heterodyned two input frequencies will be applied to an R.F. amplifier 22, the output of which is applied to an R.F. detector 24. The detector produces an output having an amplitude indicative of the amount of NO present. The output of the R.F. detector is applied to an indicator 26, which may be a low pass filter and a meter indicating the amount of the NO present. This is determined by the amplitude of the signal produced by the detector 18 in response to the product term of the two heterodyned signals.

This will be understood from the following. If it is assumed that the radiation from the laser is $I_{1L}$ cosine $\omega_{1L}T$ and a part of the radiation from the NO particle is $I_{1P}$ cosine $\omega_{1P}T$, then the detector response will be $I_{1L}^2 + I_{1P}^2 + I_{1L}I_{1P}$ cosine $(\omega_{1L}-\omega_{1P})T$, on the assumption that $\omega_{1L}-\omega_{1P}$ is small enough so that the detector will respond to the product term $I_{1L}I_{1P}$ cosine $(\omega_{1L}-\omega_{1P})T$.

Figure 2:
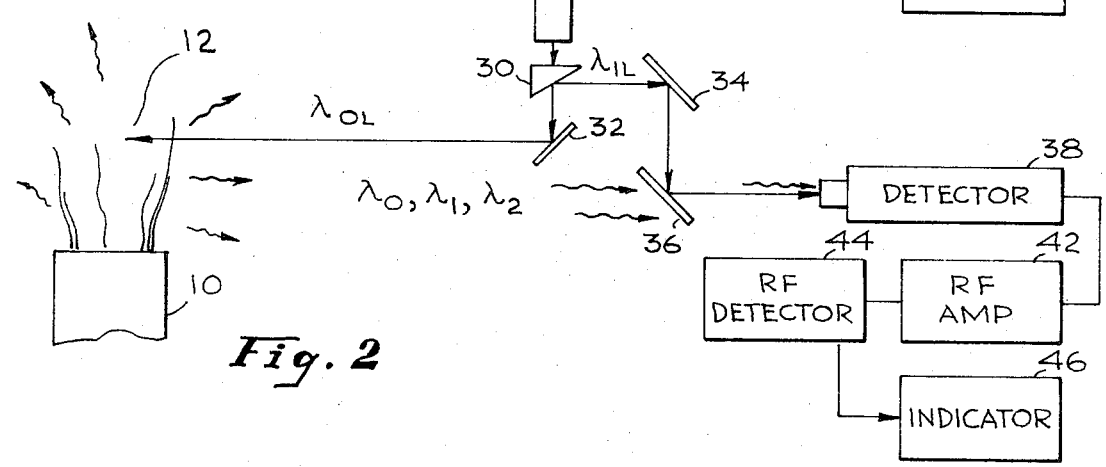
FIG. 2 is a schematic diagram of another embodiment of the invention.

FIG. 2 is a preferred embodiment of the invention. Here, the same CO laser emits certain lines which, by means of a prism 30, and a mirror 32, are directed at the emission plume 12. These lines are the ones with which are coincident in wavelength with resonant absorption and emission lines of NO, for example or of any of the other mentioned pollutants. These are designated as $\lambda_{OL}$. For example one value of $\lambda_{OL}$ could be 5.1666 microns, which is equivalent to 1935.48 $cm^{-1}$ in wavenumber units.

Other lines in the emission from the CO laser which are slightly different than $\lambda_{OL}$, and are designated as $\lambda_{1L}$, are directed at a second mirror 34. It is important to note that both $\lambda_{OL}$ and $\lambda_{1L}$ coincide closely with absorption and emission lines of NO, or some other pollutant molecule of interest. This mirror directs the line $\lambda_{1L}$ at a third reflector 36, which is a beam splitter. The line $\lambda_{1L}$ can equal, for example, 5.1886 microns, or 1927.28 cm$^{-1}$.

The laser lines which are directed at the plume and which are coincident in wavelength with some of the resonant absorption and emission lines of the NO will excite the NO molecules to a high vibrational energy level. These molecules would then collide with nearby molecules and distribute themselves among the rotational levels of the higher vibrational level.

As a consequence they will emit characteristic radiation in certain narrow wavelength bands, which are referred to as emission of fluorescent lines, and which are characteristic of the NO molecule. These are the same wavelengths as the NO thermal emission lines previously mentioned. These wavelengths are not necessarily the same wavelenths as that of the original exciting beam of radiation. This radiation passes through the beam splitter 36 and, together with the radiation $\lambda_{1L}$ falls upon the detector 38. The detector is the same as is described in connection with FIG. 1. The detector will respond to radiation from that part of an NO emission line which is within around 1 gigahertz (GHz) away from $\lambda_{1L}$ in frequency units. The output of the detector is applied to an R.F. amplifier 42. The output of the R.F. amplifier to an R.F. detector 44. The output of the R.F. detector is applied to an indicator 46. The operation of these circuits is as previously described. The indicator is only sensitive to the product term achieved by heterodyning $\lambda_{1L}$ with the fluorescent radiation frequency of the NO.

Figure 3:
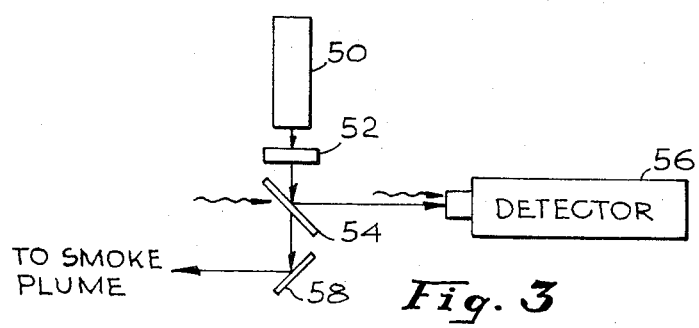
FIG. 3 is a partial view of the invention showing a modification thereof.

FIG. 3 is a view illustrating another arrangement for this invention. Only so much of the invention is shown as differs from the views shown in FIGS. 1 and 2. The laser 50 is a CO$_2$ laser. Its output frequency is doubled by passing its output through a non-linear crystal 52 which has no inversion symmetry and which transmits wavelengths in the 4.5 to 12 micron region. Some examples of materials suitable for such a crystal are materials such as tellurium, proustite or pyrargyrite.

The frequency-doubled CO$_2$ laser output is next passed through a beam splitter 54 which directs a portion of the light at a detector 56 and the balance passes through the beam splitter to a mirror 58 which directs the light toward a source of emissions to be tested. The light from the fluorescing pollutants passes to the detector 56. The frequency doubled laser beam can provide infrared emissions of various wavelengths which are absorbed by pollutants such as NO, NO$_2$, N$_2$O$_4$ and CO.

Figure 4:
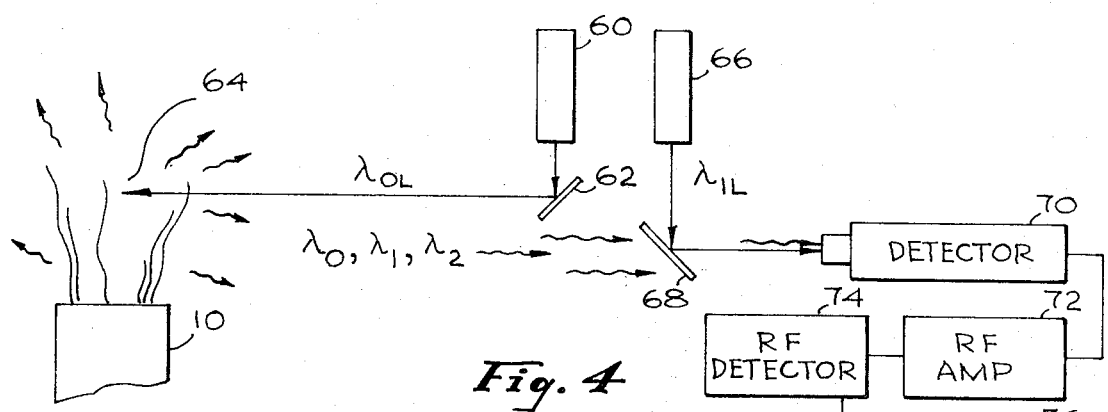
FIG. 4 is a schematic diagram of still another embodiment of the invention.

FIG. 4 represents an alternate arrangement to that previously shown and described. A laser 60, is pulsed or Q switched, emitting radiation of wavelength $\lambda_{OL}$, which is directed by a mirror 62 at the smoke plume 64, or region of air to be monitored. The radiations returned by the smoke plume may be at wavelengths $\lambda_0$, $\lambda_1$, or $\lambda_2$. A second laser 66, which is a continuous laser, emits radiation at a wavelength $\lambda_{1L}$ and has its continuous light output directed by a beam splitter 68 at a detector 70. The light returned by the fluorescing contaminants in the smoke plume passes through the beam splitter to the detector 70, there to be hexterodyned with the light from laser 66. The heterdyned output of the detector is applied to the R.F. amplifier 72, thereafter to the R.F. detector 74, whose output is applied to an indicator 76.

The laser 60 and 66 may be CO lasers, CO$_2$ lasers, or CO$_2$ lasers whose output frequency is doubled by using a crystal such as crystal 52 shown in FIG. 3.

If desired a Dicke radiometer configuration may be used for the heterodyning receiver shown. A Dicke radiometer is one wherein a rotating blade is placed in front of the detector, which interrupts the radiation incident on the receiver at a regulator interval. The rotation frequency may be within a range of 10–10,000 cycles/sec. The indicator includes a lock-in amplifier which responds only to the portion of its input whose frequency and phase are determined by the chopping frequency of the rotating blade. The lock-in amplifier is an amplifier whose input is tuned to respond to frequency and phase to an input occurring at the frequency and phase of the rotating blade. The amplifier output is followed by an integrator. The integrator output may drive a meter.

It will be appreciated that the radiometers described above need not be in contact with the emissions desired to be inspected but can be positioned remotely therefrom. Prior art detectors normally require a sample to be placed within an instrument for spectral or chemical analysis therein. In view of the use of this invention of the phenomenom of resonant excitation, an instrument, in accordance with this invention can be very discriminating and sensitive.

There has accordingly been described hereinabove a novel, and useful radiometer. It will be appreciated that while the description has been given for detecting (NO) particles such as NO, NO$_2$, N$_2$O$_4$, CO and SO$_2$, this is by way of illustration and not to be construed as a limitation upon the invention.

What is claimed is:

1. A radiometer for detecting radiations from a chemical compound in an emission comprising:

laser means for producing light radiations the wavelengths of which are nearly coincident with the wavelengths of the radiations from said chemical compound, detector means positioned to receive the radiations from said chemical compound and said laser means for heterodyning said radiations and producing a resultant output, and indicator means responsive to said resultant output for indicating the presence and amount of said chemical compound.

2. A radiometer as recited in claim 1 wherein said laser means is a carbon monoxide laser means and said chemical compound radiations are thermal radiations.

3. A radiometer as recited in claim 1 wherein said laser means produces light having wavelengths which when directed at said emission causes said chemical compound to produce fluorescent radiations, and means for directing said laser means light at said emission.

4. A radiometer as recited in claim 3 wherein said laser means is one selected from a group consisting of a CO laser means or a CO$_2$ laser means.

5. A radiometer as recited in claim 4 wherein said CO$_2$ laser means includes means for doubling the frequency of the light output of said CO$_2$ laser means.

6. A radiometer for detecting the presence of a chemical compound in an emission comprising:

laser means for producing light having a frequency which which directed at said emission causes said chemical compound to produce fluorescent radiation, detector means for producing an output responsive to the combination of said laser means emission and said chemical compound fluorescent radiation being applied thereto, means for directing light from said laser means at said detector means and at said emission causing said chemical compound to produce fluorescent radiation some of which falls on said detector means, and an indicator for indicating the amplitude of said detector means output.

7. A radiometer as recited in claim 6 wherein said laser means comprises a carbon dioxide laser and means for doubling the frequency of the light output of carbon dioxide laser.

8. A radiometer as recited in claim 6 wherein said laser means includes a first and second laser, said means for directing light from said laser means at said detector means and at said emission includes means for directing light from said first laser means at said emission, and means for directing light from said second laser means at said detector element.

9. A radiometer as recited in claim 6 wherein said means for directing said laser light includes means for directing a portion of the light output of said laser means at said emission to cause fluorescense of said chemical compound some of said fluorescent radiation travelling back to said detector means, and means for directing another portion of said laser light at said detector means, which responds to the combination of said laser light radiation and said fluorescent radiation of said chemical compound.

10. A radiometer for detecting the presence of a chemical compound in an emission comprising:

laser means for producing light having a frequency which when directed at said emission causes said chemical compound to produce fluorescent radiations, photodetector means for converting the light of said laser means and said fluorescent radiations to electrical signals, heterodyning said signals and producing an output representative thereof, means for directing light from said laser means at said detector element and at said emission whereby some of the fluorescent radiations produced by said chemical compound fall on said photodetector means, and an indicator for indicating responsive to said photodetector means output the presence and amount of said chemical compound in said emission.

11. A radiometer as recited in claim 10 wherein said laser means comprises a carbon dioxide laser and means for doubling the frequency of the light output of said carbon dioxide laser.

12. A radiometer as recited in claim 10 wherein said laser means includes a first and second laser, said means for directing light from said laser means at said detector means and at said emission includes means for directing light from said first laser means at said emission, and means for directing light from said second laser means at said detector element.

13. The method of detecting the presence of a chemical compound in a gaseous emission comprising:

generating a laser light beam having a frequency which when applied to said gaseous emission causes the chemical compound to produce fluorescent radiation, directing said laser light beam, at said gaseous emission, combining some of said fluorescent radiation with some of said laser light beam to produce a difference signal, and displaying said difference signal to indicate the presence of said chemical compound in said gaseous emission.

* * * * *